United States Patent Office 3,405,199
Patented Oct. 8, 1968

3,405,199
FLAME RETARDED COMPOSITIONS COMPRISING A THERMOPLASTIC POLYHYDROXYETHER AND A RUBBER
Robert Howard Snedeker, New Brunswick, N.J., assignor to Union Carbide Corporation, a corporation of New York
No Drawing. Continuation-in-part of application Ser. No. 128,968, Aug. 3, 1961. This application Dec. 4, 1962, Ser. No. 242,109
10 Claims. (Cl. 260—887)

ABSTRACT OF THE DISCLOSURE

Flame retarded thermoplastic compositions are prepared comprising
(a) 100 parts by weight of a thermoplastic polyhydroxyether substantially free of 1,2-epoxy groups and having repeating units of the general formula

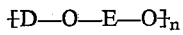

wherein D is the radical residuum of a dihydric phenol, E is the radical residuum of epichlorohydrin and $n$ is an integer representing the degree of polymerization and is at least 30;
(b) 2 to 10 parts by weight of a rubber compound selected from the group consisting of natural rubber, diene polymers, polyisobutylene and chlorosulfonated polyethylene; and
(c) 7 to 40 parts by weight of a flame-retardant mixture comprising an aromatic halide having at least one halogen substituent on the ring and a halogen carrier selected from the group consisting of oxides and sulfides of metals of Group VA of the Deming Periodic Table. The compositions are flame retarded, drip resistant and stress rupture resistant.

---

This application is a continuation-in-part of my copending application Serial No. 128,968, filed August 3, 1961, now abandoned.

This invention relates to compositions comprising thermoplastic polyhydroxyether and exhibiting improved physical properties. More particularly, the invention relates to thermoplastic polyhydroxyether compositions exhibiting improved properties, particularly environmental stress rupture resistance, and which are useful in electrical, structural and decorative applications. In a particular aspect, the invention further relates to easily fabricable thermoplastic compositions comprising thermoplastic polyhydroxyether which are flame retarded, drip resistant and stress rupture resistant.

Thermoplastic polyhydroxyether is a new material possessing numerous properties advantageous in container applications, such as transparency, toughness, and outstanding gas impermeability. Significantly, thermoplastic polyhydroxyether in addition to being tough is relatively easily formable by any of the conventional thermoplastic fabricating techniques including cold forming, blow molding, extruding, compression molding and other methods known in the plastics art.

In container applications which as used herein includes conventional packaging, such as wrapping film and bottles, as well as piping, cable jacketing, and wire insulation, a thermoplastic must resist attack by common chemical environments. Environmental stress rupture characteristics of every thermoplastic are constantly sought to be improved. Thermoplastic polyhydroxyether is no exception.

It is an object therefore of the present invention to impart increased resistance to stress rupture in chemically active environments to thermoplastic polyhydroxyether.

Other properties such as toughness of flexibility are also desirably modified and it is another object of this invention to provide such modification of thermoplastic polyhydroxyether.

In some applications of thermoplastics resistance to common chemical environments is not enough. These are the applications where an open flame can possibly be encountered. To be useful in these applications the thermoplastic must of course be resistant to combustion, i.e. flame retarded.

Thermoplastics were formerly only thought to need sufficient noncombustibility to be self-extinguishing to be widely used in structural, electrical and decorative applications. As the use of thermoplastics have become more widespread, however, it has become apparent that of equal importance with self-extinguishability is drip resistance. Frequently, although the thermoplastic itself will not sustain combustion, the ignited portions will lose strength and drip, starting fires on contact with flammable material nearby. For example, thermoplastic wire covering may be ignited by an overload in the wire and although the flame dies quickly, the hot thermoplastic coating can drip from the wire and contact something combustible. Disastrous fires may result.

Attempts to develop a thermoplastic composition possessing the requisite degree of flame-retardance and drip inhibition, but nonetheless offering ease of fabrication and good electrical and physical properties has heretofore been centered on polyethylene because this resin offers most of the desired properties, except for drip inhibition. Known flame-retarded polyethylene compositions drip when ignited.

It is, therefore, an object of the present invention to provide a thermoplastic composition which provides in combination easy fabricability, flame-retardance, drip inhibition and outstanding physical properties, and which is, therefore, an outstanding material for structural, electrical and decorative applications.

Thermoplastic polyhydroxyether compositions have now been discovered wherein the foregoing and other objects are realized.

It has been discovered that inclusion of up to about 50 parts by weight of a rubber compound in 100 parts by weight of a thermoplastic polyhydroyether greatly increases the environmental stress rupture resistance of the thermoplastic polyhydroxyether while retaining the advantageous properties, e.g. toughness and dimensional stability. Rubber compounds appear to be unique in imparting environmental stress rupture resistance improvement to thermoplastic polyhydroxyether.

Use of up to about 100 parts by weight of a rubber compound in 100 parts of thermoplastic polyhydroxyether has been found to alter toughness and flexibility properties depending on the amount.

It has further been discovered that the addition of from 2 to 10 parts by weight of a rubber compound per 100 parts by weight of thermoplastic polhydroxyether in a flame retarded polyhydroxyether composition inhibits the dripping of the flame-retarded polyhydroxyether during ignition. This phenomenon of drip-inhibition of burning thermoplastic polyhydroxyether has not been observed in combinations of rubber with other flame-retarded thermoplastic resins.

Rubber compounds useful in this invention comprise a wide variety of both natural and synthetic rubbers. Illustrative of such rubber compounds are, among the natural rubbers: balata, caoutchouc, caucho gutta percha, guttasiak, juleting, kickxia, manihot, and latex from Havea brasiliensis; and among the synthetic rubber compounds, synthetic substituted and unsubstituted monoolefinically unsaturated polymers, for example, homopolymers of mono-olefinically unsaturated monomers such as isobutylene, modified homopolymers of mono-olefinically unsaturated monomers such as modified ethylene polymer, e.g. chlorosulfonated polyethylene, synthetic diene polymers such as homopolymers of hydrocarbons containing two unsaturated bonds such as chloroprene, butadiene-1,3, isoprene, 2,3-dimethyl butadiene-1,3 and the like; copolymers of the foregoing with one or more copolymerizable mono- or di-olefinic monomers containing at least one >C=C< group. These last mentioned monomers are generally of low molecular weight, having less than 10 carbon atoms, and contain at least two hydrogen atoms and at least one radical other than hydrogen attached to the unsaturated double bond carbon atoms, as in the structure where at least one of the

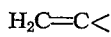

free valences is attached to a group other than hydrogen, for example, chlorine, alkyl, alkoxy, acryl, cyano and aryl.

Typical of such copolymerizable, olefinically unsaturated monomers are styrene, p-methyl styrene, α-methyl styrene, p-chloro styrene, vinyl naphthalene and similar aryl olefins and substituted aryl olefins; isobutylene and butadiene and similar copolymerizable mono- and di-olefinic hydrocarbons; acrylic and substituted acrylic acids and their esters, nitriles and amides such as acrylic acid, acrylonitrile, methacrylonitrile, α-chloroacrylonitrile, methyl acrylate, methyl methacrylate, ethyl methylacrylate, methyl-α-chloro acrylate, acrylamide, methacrylamide and the like; vinyl methyl ketone, vinyl methyl pyrollidone and similar copolymerizable compounds well known to those in the art.

For their added advantages of maximum thermal stability and compatability and absence of color, the homopolymer of isobutylene and copolymers of butadiene-1,3 with for example from 10 to 90 percent styrene are particularly preferred as the rubber compound in the present compositions.

The thermoplastic polyhydroxyethers used in combination with the foregoing rubber compounds with or without flame retardants are materials of great toughness, and high rigidity and tensile strength possessing excellent electrical properties, as well as advantageous characteristics in the areas of dimensional stability, gloss, colorability, resistance to acids and alkalies, and in fabricability. The properties and characteristics of polyhydroxyethers make them highly useful in such demanding applications as business machine components, fuel pumps, gas lines, jerry cans, light diffusers, junction boxes, parts and housings for washing machines, food containers, and ornamental uses such as grilles and similar applications where attractiveness and strength must both be present.

Thermoplastic polyhydroxyethers have the general formula

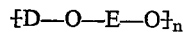

wherein D is the radical residuum of a dihydric phenol, E is a radical residuum of an expoxide selected from mono- and di-epoxides and contains from one to two hydroxyl groups and $n$ is an integer which represents the degree of polymerization and is at least 30 and preferably is above about 80.

In general, thermoplastic polyhydroxyethers are prepared by contacting under polymerization conditions a dihydric phenol and an epoxide containing from one to two epoxide groups in substantially equimolar amounts. Ordinarily from 0.985 to 1.015 moles and preferably one mole of the epoxide is employed per mole of dihydric phenol. Polymerization occurs at room temperature (25° C.) and lower but only slowly, hence ordinarily, an elevated temperature e.g. 40° C. to 250° C. or more preferably from 80 to 125° C. is used to ensure a rapid rate of polymerization. Pressure is not at all critical, with polymerization being successfully effected at atmospheric, subatmospheric, or superatmospehric pressure with or without an inert gas such as nitrogen in the reaction vessel.

In particular, to prepare a polyhydroxyether from a dihydric phenol such as bisphenol-A and a monoepoxide such as epichlorohydrin, there is placed in a reaction vessel from 0.985 to 1.015 moles of the epichlorohydrin, preferably one mole, per mole of bisphenol-A together with about 0.6 to 1.4 moles, preferably from about 1.02 to 1.25 moles per mole of dihydric phenol of an alkali metal hydroxide such as sodium hydroxide, potassium hydroxide, lithium hydroxide and the like, added entirely initially or 5 to 50 percent added stepwise over the course of the reaction, generally in an aqueous medium and the mixture is heated at a temperature of about 10° C. to about 50° C. preferably from about 20° C. to about 40° C. to effect a coupling of the reactants, adjusting, if necessary, the amounts of alkali metal hydroxide in the reaction mixture so that the final concentration of alkali in the aqueous phase of the reaction mixture at the completion of the reaction is between about 0.1 and 1.2 molal and preferably between about 0.3 and 0.6 molal, and heating the reaction mixture at a temperature of from about 60° C. to boiling or reflux or higher under pressure to obtain a polyhydroxyether having the desired molecular weight.

The product produced by the foregoing reaction between bisphenol-A and epichlorohydrin has the repeating unit

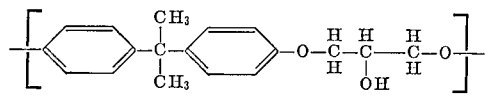

and can be termed a poly(monohydroxyether) of bisphenol-A.

To prepare a polyhydroxyether from a dihydric phenol such as hydroquinone and a diepoxide such as butadiene dioxide, there is placed in a reaction vessel from 0.985 to 1.015 moles of the butadiene dioxide per mole of hydroquinone, and the reactants are heated at a temperature from 10° C. to 250° C. particularly from 80 to 125° C. and, preferably at atmospheric reflux until there is obtained a polyhydroxyether of the desired molecular weight. Reaction under alkaline conditions is preferred. Pressure is not critical and reaction can be successfully effected at atmospheric, sub-atmospheric, or superatmospheric pressure with or without an inert gas such as nitrogen in the reaction vessel. It is not necessary, but it is generally desirable to employ an acidic or acid accepting compound as a catalyst for the reaction. Numerous compounds can be used and in catalytic amounts e.g. from 0.00005 to 3 percent and higher by weight based on the dihydric phenol. Among others there can be mentioned the hydroxides and alkoxides of the alkali metals, such as sodium, potassium and lithium hydroxides and sodium ethoxide; tertiary amines such as tribenzyl amine, as well as quaternary ammonium salts. Other suitable catalysts include the Lewis acids, and Friedel-Crafts catalysts, such as metal halides, e.g. zinc chloride, boron trifluoride and aluminum bromide as well as other acidic compounds.

The product produced by the foregoing reaction between hydroquinone and butadiene dioxide has the repeating unit

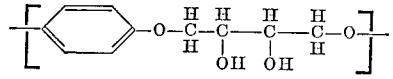

and can be termed a poly(dihydroxyether) of hydroquinone.

By the use of both a monoepoxide and a diepoxide poly (hydroxy-dihydroxyethers) can be obtained, the relative amounts of mono- and diepoxide determining the final concentration of the mono- and dihydroxy containing repeating units E in the polymer.

Poly(hydroxy-dihydroxyethers) are prepared in the same manner as polydihydroxyethers except that there is additionally employed from 0.6 to 1.5 moles of alkali metal hydroxide per mole of dihydric phenol e.g. lithium, sodium or potassium hydroxide.

The dihydric phenol and epoxide can be contacted while fluid, i.e., while in solution or in the melt. Solution reaction is preferred for best heat transfer and highest degree of control over the reaction. Suitable solvents include, among others, hydroxylic solvents, e.g. water, methanol, ethanol, propanol-2, and n-butanol; ethers e.g. dioxane, diethyl ether, dibutyl ether, diphenyl ether, dimethyl ether of ethylene glycol, and dimethyl ether of diethylene glycol; esters e.g. ethyl acetate and propyl acetate; aromatic and aliphatic ketones, e.g. acetophenone, benzophenone, acetone, methyl ethyl ketone and methyl isobutyl ketone; aromatic hydrocarbons e.g. benzene, toluene, o-, m- and p-xylene; halogenated aromatic hydrocarbons e.g. carbon tetrachloride, methylene chloride and 1,1,2,2-tetrachloroethane, amides e.g. dimethylformamide and dimethyl acetamide; aliphatic hydrocarbons such as n-hexane, n-heptane and the like; cycloaliphatic hydrocarbons such as cyclohexane, n-propyl cyclohexane and the like; and sulfoxides e.g. dimethyl sulfoxide.

Polyhydroxyethers are high molecular weight, stable thermoplastic polymers which can be thermoformed into various useful contours such as films, fibers, molded articles and the like. Films of polyhydroxyethers are of special interest since they are flexible, clear and colorless, have good oxygen and water vapor barrier properties, and exhibit surprisingly high adhesiveness to numerous substrates. Articles molded of polydihydroxyethers such as dishpans and bottles are strong and tough, exhibiting high values in tensile modulus, tensile strength, elongation and pendulum impact.

The polyhydroxyethers herein taught are, as stated, thermoplastic in nature and are, therefore, to be sharply distinguished from thermosetting, curable "epoxy" resins now known which, according to U.S.P. 2,503,726 to Greenlee, for example, can be prepared by the reaction of dihydric phenols e.g. bisphenol-A, and polyepoxy compounds such as butylene dioxide (butadiene dioxide) and which can be represented by the formula

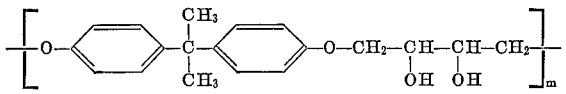

wherein $m$ is an integer from 2 to about 20 as maximum. These low molecular weight epoxy resins are brittle and friable and do not possess adequate toughness for typical plastics applications unless reacted with other materials and converted to the thermoset state. They are, therefore, of no utility in injection molding applications and in formation of thin self-sustaining films.

Somewhat higher molecular weight resins, which are obtained by reacting a dihydric phenol with epichlorohydrin, have apparently been disclosed by Carpenter et al. in U.S.P. 2,602,075 issued July 1, 1952.

Any dihydric phenol can be used in forming polyhydroxyethers. Illustrative dihydric phenols are mononuclear dihydic phenols such as hydroquinone, resorcinol, and the like as well as the polynuclear phenols which are preferred. The dihydric polynuclear phenols have the general formula

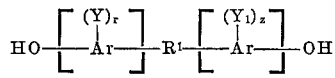

wherein: Ar is an aromatic divalent hydrocarbon radical such as naphthylene and phenylene with phenylene being preferred for the thermoplastic polyhydroxyethers used in this invention; Y and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxy- ethyl, n-butyloxy, amyloxy and the like, preferably an alkoxy radical having a maximum of 4 carbon atoms. It is to be understood that whenever there are substituents, exclusive of the hydroxyl groups on either or both of the aromatic divalent hydrocarbon groups, these substituents can be the same or different; $r$ and $z$ are integers having a value of from 0 to a maximum value corresponding to the number of hydrogen atoms on the aromatic ring (Ar) which can be replaced by substituents and can have the same or different values; and $R^1$ is a bond between adjacent carbon atoms as in dihydroxydiphenyl or a divalent radical, for example

or —O—, or —S—, or —SO—, or —SO$_2$—, or —S—S—, or a divalent hydrocarbon radical as for example an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical such as 1,4-cyclohexylene, 1,3-cyclohexylene, cyclohexylidene, and the like, or halogenated alkylidene, alkylene, or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy-2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4,(2-n-dodecylphenylene) and the like; or $R^1$ can be a ring which is fused to one of the Ar groups as is the case, for example, in the compound having the formula:

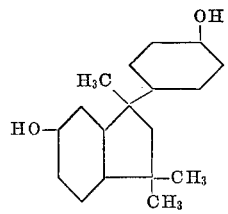

or $R^1$ can be a polyalkoxy radical such as polyethoxy, polypropoxy, polythioethoxy, polybutoxy, polyphenylethoxy; or $R^1$ can be a radical containing a silicon atom as, for example polydimethylsiloxy, polydiphenylsiloxy, polymethylphenylsiloxy and the like; or $R^1$ can be two or more alkylidene radicals separated by an aromatic ring, a tertiary amino group, an ether linkage, a carbonyl group or separated by a linkage containing sulfur such as sulfide, sulfoxide and the like.

Particularly preferred are dihydric polynuclear phenols having the general formula:

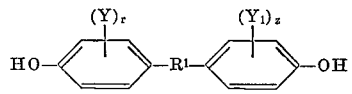

wherein Y, $Y_1$, are as previously defined, $r$ and $z$ have values of from 0 to 4 inclusive and $R^1$ is an alkylene or alkylidene group, preferably having from 1 to 3 carbon atoms inclusive or $R^1$ is a saturated group such as is obtained from compounds such as vinylcyclohexene and dipentene or its isomers by reaction with two moles of phenol per mole of the compound. $R^1$ preferably contains from 1 to 9 carbon atoms.

Thermoplastic polyhydroxyethers produced using the dihydric polynuclear phenols described in the preceding paragraph have extremely good mechanical properties. In addition, polyhydroxyethers produced using a dihydric polynuclear phenol wherein $R^1$ is the saturated group from vinylcyclohexene or dipentene or its isomers have heat distortion temperatures which are relatively high.

Examples of other specific dihydric phenols include among others:

The bis-(hydroxyphenyl)-alkanes such as 2,2-bis-(4-hydroxyphenyl)-propane,
2,4'-dihydroxy diphenylmethane,
bis-(2-hydroxyphenyl)-methane,
bis-(4-hydroxyphenyl)-methane,
bis-(4-hydroxy-2,6-dimethyl-3-methoxyphenyl)-methane,
1,1-bis-(4-hydroxyphenyl)-ethane,
1,2-bis-(4-hydroxyphenyl)-ethane,
1,1-bis-(4-hydroxy-2-chlorophenyl)-ethane,
1,1-bis-(3-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,
1,2-bis-(phenyl)-propane,
2,2-bis-(4-hydroxyphenyl)-1-phenylpropane and the like.

Di(hydroxyphenyl)sulfones such as bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone, and the like.

Di(hydroxyphenyl)ethers such as
bis-(4-hydroxyphenyl)-ether,
the 4,3'-, 4,2'-, 2,2'-, 2,3'-, dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynapthyl)-ether,
bis-(4-hydroxy-3-chloronaphthyl)-ether,
bis-(2-hydroxydiphenyl)-ether,
4,4'-dihydroxy-2,6-dimethoxy-diphenyl ether,
4,4'-dihydroxy-2,5-diethoxydiphenyl ether, and the like.

Also suitable are the bisphenol reaction products of 4-vinylcyclohexene and phenols, e.g. 1,3-bis(p-hydroxyphenyl)-1-ethylcyclohexane, and the bisphenol reaction products of dipentene or its isomers and phenols as well as 1,3,3-trimethyl-1-(4-hydroxyphenyl)-6-hydroxyindane, and 2,4-bis-(4-hydroxyphenyl)-4-methylpentane, and the like.

Mixtures of dihydric phenols can also be employed and wherever the term "dihydric phenol" or "dihydric polynuclear phenol" is used herein, mixtures of these compounds are intended to be included.

The dihydric phenols which are used are substantially free of higher functional phenolic compounds, that is, phenols containing three or more phenolic hydroxyl groups, such as trihydric phenols or trisphenols. In general, the dihydric polynuclear phenols used should contain less than about 1.5 mole percent and preferably less than about 0.5 mol percent, based on the moles of dihydric polynuclear phenol, of such higher functional phenols.

The concentration of the higher functional phenolic compounds in the dihydric phenols can be readily measured by conventional chromatographic techniques such as described by W. M. Anderson, G. B. Carter and A. J. Landua in Analytical Chemistry 31, 1214 (1959) and if necessary, the dihydric phenol can be purified by recrystallization from a suitable solvent such as toluene.

More than about 1.5 mole percent of a higher functional phenolic compound can be tolerated in the dihydric phenols provided that an equivalent amount of a monohydric phenol is added in order to offset the increased functionality of the resultant system.

If desired, monohydric phenols can be added to the reaction mixture containing the dihydric phenol and the diepoxide at the start of the reaction or at any other convenient time during the course of the reaction. The monohydric phenols serve to regulate the molecular weight of the polydihydroxyether by acting as a chain terminator. When used as chain terminator, the monohydric phenols are used in amounts of from about 0.01 mole to about 0.05 mole, preferably about 0.01 mole to about 0.02 mole per mole of the dihydric phenol. This amount is in addition to the amount of monohydric phenol used for purposes of offsetting the presence of higher functional phenolic compounds as explained in the preceding paragraph. Illustrative of suitable monohydric phenols are the following: phenol, alkylated monohydric phenols such as m-cresol, ethyl phenol, p-tertiary butylphenol and the like; alkoxy monohydric phenols such as m-methoxyphenol, m-ethoxyphenol and the like; halogenated monohydric phenols such as m-chlorophenol, m-bromophenol and the like, and p-phenylphenol and the like.

Diepoxides useful for the preparation of polyhydroxyethers can be represented by the formula

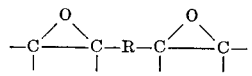

wherein R is representative of a bond between adjacent carbon atoms or a divalent inorganic or organic radical such as an aliphatic, aromatic, homocyclic, heterocyclic or acyclic arrangement of atoms.

By the term "diepoxide" is meant a compound containing two epoxide groups i.e. groups containing an oxirane oxygen atom bonded to two vicinal aliphatic carbon atoms. Saturated diepoxides in which both the oxirane oxygen atoms are bonded to carbon atoms of a saturated aliphatic hydrocarbon chain are particularly preferred. The term "saturated diepoxides" refers to diepoxides which are free of ethylenic unsaturation, i.e. $>C=C<$ and acetylenic unsaturation, i.e.

—C≡C—

Diepoxides which contain solely carbon, hydrogen and oxygen atoms are especially preferred. The oxygen atoms can be (in addition to oxirane oxygen), ether oxygen, i.e. —O—; oxacarbonyl oxygen, i.e.,

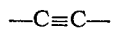

carbonyl oxygen, i.e.

and the like. A single diepoxide or a mixture of at least two diepoxides can be employed in preparing the polydihydroxyethers of the present invention and the term "diepoxide" is intended to include a mixture of at least two diepoxides.

Illustrative diepoxides include, for example, the alkanediol bis(3,4-epoxycyclohexanecarboxylates),
the alkenediol bis(3,4-epoxycyclohexanecarboxylates),
the alkanediol bis(lower alkyl substituted-3,4-epoxycyclohexanecarboxylates),
the oxaalkanediol bis(lower alkyl substituted-3,4-epoxycyclohexanecarboxylates), the oxaalkanediol bis(lower alkyl substituted-3,4-epoxycyclohexanecarbonates), and the like.

Specific compounds which can be mentioned are:
diethylene glycol bis(3,4-epoxycyclohexanecarboxylate),
2-ethyl-1,3-hexanediol bis(3,4-epoxycyclohexanecarboxylate),
diethylene glycol bis(3,4-epoxy-6-methylcyclohexanecarboxylate),
3-methyl-1,5-pentanediol bis(3,4-epoxycyclohexanecarboxylate),
3-methyl-1,5-pentanediol-bis(3,4-epoxy-2- or
3 or 4 methylcyclohexanecarboxylate),
triethylene glycol bis 3,4-epoxycyclohexanecarboxylate),
1,5-pentanediol bis(3,4-epoxycyclohexanecarboxylate),
2-methoxymethyl-4-dimethyl-1,5-pentanediol bis(3,4-epoxycyclohexanecarboxylate),
ethylene glycol bis(3,4-epoxycyclohexanecarboxylate),
ethylene glycol bis(3,4-epoxy-6-methylcyclohexanecarboxylate),
2-ethylhexane-1,3-diol glutarate 3,4-epoxycyclohexanecarboxylate,
"Carbowax 400" bis(6-methyl-3,4-epoxycyclohexanecarboxylate),
"Carbowax 1000" bis(6-methyl-3,4-epoxycyclohexanecarboxylate),
"Polypropylene glycol 2025" bis(6-methyl-3,4-epoxycyclohexanecarboxylate),
2-ethylhexane-1,3-bis(6-methyl-3,4-epoxycyclohexanecarboxylate),
2,2'-sulfonyldiethanol bis-(3,4-epoxycyclohexanecarboxylate),
2,2-diethyl-1,3-propanediol bis-(3,4-epoxycyclohexanecarboxylate),
1,6-hexanediol bis-(3,4-epoxycyclohexanecarboxylate).

The diol poly(3,4 - epoxycyclohexanecarboxylates) above-mentioned can be prepared by epoxidizing the corresponding diol poly(cyclohexanecarboxylate) with at least a stoichiometric quantity of peracetic acid (preferably as a solution in ethyl acetate) per carbon to carbon double bond of said diol poly(cyclohexanecarboxylate), at a temperature in the range of from about 25° to 90° C., for a period of time sufficient to introduce oxirane oxygen at the sites of the carbon to carbon double bonds contained in the diol poly(cyclohexenecarboxylate) reagent. The diol poly(cyclohexenecarboxylates), in turn, can be prepared in accordance with well known condensation techniques, e.g., the esterification of a polyol, e.g., ethylene glycol, diethylene glycol, triethylene glycol, tetraethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, and the like; with a 3-cyclohexenecarboxylic acid, e.g., 3-cyclohexenecarboxylic acid, lower alkyl substituted-3-cyclohexenecarboxylic acid, and the like. The expression "lower alkyl," as used in the disclosure, means an alkyl radical which contains from 1 to 4 carbon atoms.

Other diepoxides contemplated include, for instance, the bis(3,4-epoxycyclohexylmethyl) hydrocarbon dicarboxylates and the bis(lower alkyl substituted-3,4-epoxycyclohexylmethyl)hydrocarbon dicarboxylates, e.g., bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) maleate,
bis(3,4-epoxycyclohexylmethyl) tetrahydrophthalate,
bis(3,4-epoxycyclohexylmethyl) citraconate,
bis(3,4-epoxycyclohexylmethyl) isocitraconate,
bis(3,4-epoxy-6-methylcyclohexylmethyl) fumarate,
bis(3,4-epoxycyclohexylmethyl) pimelate,
bis(3,4-epoxycyclohexylmethyl) terephthalate,
bis(3,4-epoxycyclohexylmethyl) azelate,
bis(3,4-epoxycyclohexylmethyl) sebacate,
bis(3,4-epoxycyclohexylmethyl) itaconate,
bis(3,4-epoxycyclohexylmethyl) hexahydrophthalate,
bis(3,4-epoxycyclohexylmethyl) phthalate,
bis(3,4-epoxycyclohexylmethyl) glutaconate,
bis(3,4-epoxycyclohexylmethyl) hydromuconate,
and the like, including the
bis(3,4-epoxy-6-methylcyclohexylmethyl) hydrocarbon dicarboxylates such as
bis(3,4-epoxy-6-methylcyclohexylmethyl) adipate,
bis(3,4-epoxy-6-methylcyclohexylmethyl) succinate, and
bis(3,4-epoxy-6-methylcyclohexylmethyl) sebacate and the like, as well as
di(3,4-epoxycyclohexylmethyl)-2-ethylhexyl-1,2,4-butane tricarboxylate.

Other desirable diepoxides include the monoesters of 3,4-epoxycyclohexylmethanols and 3,4-epoxycyclohexanecarboxylic acids such as, for example, 3,4-epoxycyclohexylmethyl 3,4-epoxycyclohexanecarboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
3,4-epoxy-(3 or 4)-methylcyclohexylmethyl-3,4-epoxy (3 or 4)-methylcyclohexanecarboxylate,
4-n-propyl-3,4-epoxycyclohexylmethyl 4-n-propyl-3,4-epoxycyclohexanecarboxylate,
5-isobutyl-3,4-epoxycyclohexylmethyl 5-isobutyl-3,4-epoxycyclohexanecarboxylate,
9,10-epoxyoctadecyl-6-methyl-3,4-epoxycyclohexanecarboxylate,
lower alkyl substituted-3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chlorodiepoxystearyl ether,
3-oxatetracyclo[4.4.0.1$^{7,10}$.0$^{2,4}$]undec-8-yl 2,3-epoxycyclopentyl ether,
3-oxatetracyclo-[4.4.0.1$^{7,10}$.0$^{2,4}$]undec-8-yl 2,3-epoxycyclopentylmethyl ether,
3-oxatetracyclo[4.4.0.1$^{7,10}$.0$^{2,4}$]undec-8-yl alkyl substituted 3,4-epoxycyclohexyl ether,
3-oxatetracyclo-[4.4.0.1$^{7,10}$.0$^{2,4}$]undec-8-yl 3,4-epoxycyclohexyl ether,
3-oxatetracyclo[4.4.0.1$^{7,10}$.0$^{2,4}$]undec-8-yl 2,3-epoxycyclohexyl ether,
3-oxatetracyclo[4.4.0.1$^{7,10}$.0$^{2,4}$]undec-8-yl 3,4-epoxycyclohexylmethyl ether,
3-oxatetracyclo-[4.4.0.1$^{7,10}$.0$^{2,4}$]undec-8-yl 6-methyl-3,4-epoxycyclohexylmethyl ether,
3-oxatetracyclo[4.4.0.1$^{7,10}$.0$^{2,4}$]undec-8-yl 5-methyl-3,4-epoxycyclohexylmethyl ether,
3-oxatetracyclo-[4.4.0.1$^{7,10}$.0$^{2,4}$]undec-8-yl alkyl substituted 3-oxatricyclo-[3.2.1.0$^{2,4}$]oct-6-yl ether,
3-oxatetracyclo-[4.4.0.1$^{7,10}$.0$^{2,4}$]undec-8-yl 3-oxatricyclo-[3.2.1.0$^{2,4}$]oct-6-yl ether, and the like.

Other diepoxides contemplated include, for example, the bis(vicinal - epoxyalkyl sulfones, bis(vicinal - epoxyalkylalkoxy) sulfones, bis(vicinal-epoxycycloalkyl) sulfones, the bis-vicinal-epoxycycloalkylalkyl) sulfones, the vicinal-epoxyalkyl 3-oxatetracyclo [4.4.0.1$^{7,10}$.0$^{2,4}$]undec-8-yl sulfones, and the like. Examples of these diepoxy sulfones include bis(2,3-epoxycyclopentyl) sulfone, bis(2-ethyl-2,3-epoxycyclopentyl) sulfone, bis(4-n-butyl-2,3-epoxycyclopentyl-3,4-epoxycyclohexanecarboxylate, 2 - bromo - 3,4-epoxycyclohexylmethyl 2 - bromo-3,4-epoxycyclohexanecarboxylate, and the like.

Other diepoxides include ethers wherein the oxirane oxygens are connected in epoxy groups wherein the carbon atoms are a part of a branched or straight chain aliphatic hydrocarbon such as bis(2,3-epoxy-2-ethylhexyl)ether, diglycidyl ether, diglycidyl Cellosolve, bis(2,3-epoxybutyl) ether, bis(2,3-epoxy-2-methylpropoxy) ethane, 2,3-epoxybutyl-2-methyl-glycidyl ether, di(2-methylglycidyl) Carbitol, bis(2-neopentylglycidyl) ether, glycidyl- (2,3-epoxypropoxy) propionate, bis(2,3-epoxy-5,5,7,7-tetramethyloctyl) ether α,α'-diglycidyloxypara-xylene, bis(glycidyl Cellosolve) maleate, and the like.

Other diepoxides which can be mentioned include those wherein the two oxirane groups are linked through an aromatic ether i.e. compounds having the grouping

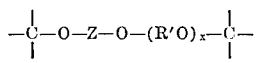

wherein R' is a divalent organic radical, Z is a divalent aromatic radical residuum of a dihydric phenol such as those listed above in the description of dihydric phenols, and $x$ is an integer from 0 to 1 inclusive.

Still other diepoxides include ethers wherein the oxirane groups are connected to vicinal carbon atoms at least one pair of which is a part of a cycloaliphatic hydrocarbon. Among others there can be mentioned:

bis(2,3-epoxycyclopentyl) ether,
4(2,3-epoxybutoxy)-9-oxatetracyclo [4.4.1$^{2,4}$.0$^{1,6}$.0$^{8,10}$]-undecane,
2,3-epoxycyclopentyl-2-methylglycidyl ether,
1,4-butanediol bis(3,4-epoxycyclohexylmethyl)ether,
1,4-butanediol bis(1-methyl-3,4-epoxycyclohexylmethyl)-ether,
1,5-pentanediol bis(6-methyl-3,4-epoxycyclohexylmethyl)-ether,
p-xylene-α,α'-bis(6-methyl-3,4-epoxycyclohexylmethyl)-ether,
bis(6-methyl-3,4-epoxycyclohexylmethyl)ether,
ethylene glycol bis(3-oxatetracyclo [4.4.1$^{7,10}$.0$^{1,6}$.0$^{2,4}$] undecyl-8-ether),
bis(3-oxatetracyclo [4.4.1$^{7,10}$.0$^{1,6}$.0$^{2,4}$]undecyl-8-ether),
3,4-epoxycyclohexylmethyl-6-methyl-3,4-epoxycyclohexylmethylether,
6-oxabicyclo 3.1.0 hexan-2-y1-9-oxatetracyclo-[5.3.1.0$^{2,6}$.0$^{8,10}$]undecan-3-y1 ether,
bis [9-oxatetracyclo [5.3.1.0$^{2,6}$.0$^{8,10}$]undecan-3-y1]ether,
bis(3-oxatetracyclo [4.4.0.1$^{7,10}$.0$^{2,4}$]undec-8-yl)ether; and the like.

Additional diepoxides include, bis(2,3-epoxy-2-ethylhexyl)adipate,
2,3-epoxy-2-methylpentyl 3,4-epoxycyclohexane carboxylate,
bis(2,3-epoxy-2-methylpropyl)succinate,
bis(2,3-epoxy-2-ethylhexyl)pimelate,
ethylene glycol bis(2,3-epoxybutyrate),
bis(2,3-epoxy-2-ethylhexyl) phthalate,
2-ethyl-1,3-hexanediol-2-ethyl-2,3-epoxyhexyl adipate polyester,
bis(2-methyl-2,3-epoxyamyl)pimelate.

Further diepoxides are contemplated, for example, bis(9,10-epoxyoctadecyl) phthalate, diglycidyl maleate, diglycidyl succinate, diglycidyl phthalate, di(2-methylglycidyl) hexahydrophthalate, alkyl diglycidyl-1,2,4-butane tricarboxylate, dipropylene gycol bis(2-ethylhexyl-4,5-epoxycyclohexane-1,2-dicarboxylate), and the like.

Still other desirable epoxides include, by way of illustration, the 3-oxatetracyclo[4.4.0.1$^{7,10}$.0$^{2,4}$]undec-8-yl vicinal-epoxyalkyl ethers, the 3-oxatetracyclo[4.4.0.1$^{7,10}$.0$^{2,4}$]undec-8-yl vicinal-epoxycycloalkyl ethers, the 3-oxatetracyclo[4.4.0.1$^{7,10}$.0$^{2,4}$]undec - 8-yl vicinal-epoxycycloalkylalkyl ethers, the 3-oxatetracyclo[4.4.0.1$^{7,10}$.0$^{2,4}$]undec-8-yl 3-oxatricyclo[3.2.1.0$^{2,4}$]oct-6-yl ethers, the 3-oxatetracyclo[4.4.0.1$^{7,10}$.0$^{2,4}$]undec - 8-yl 3-oxatricyclo-[3.2.1.0$^{2,4}$]oct-6-ylalkyl ethers, and the like. Specific examples include 3-oxatetracyclo[4.4.0.1$^{7,10}$.0$^{2,4}$]undec-8-yl 2,3-epoxypropyl ether, 3-oxatetracyclo[4.4.0.1$^{7,10}$.0$^{2,4}$]undec-8-yl 3,4-epoxybutyl ether, 3-oxatetracyclo[4.4.0.1$^{7,10}$.0$^{2,4}$]undec-8-yl 2,3-epoxybutyl ether, 3-oxatetracyclo[4.4.0.1$^{7,10}$.0$^{2,4}$]undec-8-yl 3,4-epoxyhexyl ether, 3-oxatetracyclo[4.4.0.1$^{7,10}$.0$^{2,4}$]undec - 8-yl 5,6-epoxyhexyl ether, 3-oxatetracyclo[4.4.0.1$^{7,10}$.0$^{2,4}$]undec - 8-yl 7,8-epoxyoctyl ether, 3-oxatetracyclo[4.4.0.1$^{7,10}$.0$^{2,4}$]undec-8-yl 2-methyl-2,3-epoxypropyl ether, 3-oxatetracyclo[4.4.0.1$^{7,10}$.0$^{2,4}$]undec-8-yl 2-ethyl-2,3-epoxyhexyl ether, 3-oxatetracyclo[4.4.0.1$^{7,10}$.0$^{2,4}$]undec - 8-yl 9,10,12,13-sulfone, bis(3,4-epoxycyclohexyl) sulfone, bis(lower alkyl substituted 3,4-epoxycyclohexyl) sulfone, bis(2-methyl-3,4-epoxycyclohexyl) sulfone, bis(5-isopropyl-3,4-epoxycyclohexyl) sulfone bis(3,4-epoxycloheptyl) sulfone, bis(lower alkyl substituted 3,4-epoxycycloheptyl) sulfone, bis(2,3-epoxycyclopentylalkyl) sulfone, bis(2,3-epoxycyclopentylmethyl) sulfone, bis(2,3 - epoxycyclo pentylpropyl) sulfone, bis(3,4-epoxycyclohexylalkyl) sulfone, bis(3,4-epoxycyclohexylmethyl) sulfone, bis(3,4-epoxycyclohexylbutyl) sulfone, bis(3,4-epoxycycloheptylalkyl) sulfone, bis(3,4-epoxycycloheptylmethyl) sulfone, bis(3-oxatricyclo[3.2.1.0$^{2,4}$]oct-6-yl sulfone, bis(3-oxatetracyclo[4.4.0.1$^{7,10}$.0$^{2,4}$]undec - 8-yl) sulfone, 2,3-epoxypropyl-2,3-epoxycyclopentyl sulfone, 2-methyl-2,3-epoxypropyl 2,3-epoxycyclopentylmethyl sulfone, 10,11-epoxyoctadecyl 3,4-epoxycyclohexyl sulfone, 2-methyl-2,3-epoxyhexyl 3-oxatricyclo[3.2.1.0$^{2,4}$]oct-6-yl sulfone, 2,3-epoxycyclopentyl 3-oxatetracyclo[4.4.0.1$^{7,10}$.0$^{2,4}$]-undec-8-yl sulfone, 2-methyl-3,4-epoxycyclohexyl 2,3-epoxycyclopentylethyl sulfone, 3,4-epoxypentyl 2-n-butyl-3,4-epoxycyclohexyl sulfone, and the like.

Still other diepoxides contemplated include, for example, bis(vicinal-epoxyhexoxyalkyl) sulfone, bis(lower alkyl substituted-vicinal-epoxyhexoxyalkyl) sulfone, bis-(vicinal-epoxycyclohexoxyalkyl( sulfone, bis(lower alkyl substituted - vicinal - epoxycyclohexoxyalkyl) sulfone, bis(vincinal - epoxycyclohexylalkoxyalkyl) sulfone, bis-(lower alkyl substituted-3-oxatricyclo[3.2.1.0$^{2,4}$]-6-octoxyalkyl) sulfone, bis(3-oxatetracyclo[4.4.0.1$^{7,10}$.0$^{2,4}$]-8-undecoxyalkyl) sulfone, vicinal-epoxyalkoxyalkyl 3-oxatricyclo[3.2.1.0$^{2,4}$]-6 - octoxyalkyl sulfone, vicinal-epoxycyclohexoxyalkyl 3 - oxatetracyclo[4.4.0.1$^{7,10}$.0$^{2,4}$]-8-undecoxyalkyl sulfone, and the like. Specific examples of the preceding diepoxy diether sulfones include, among others, bis(3,4-epoxyhexoxypropyl) sulfone, bis(2,5-dimethyl-3,4-epoxyhexoxypropyl) sulfone, bis(3,4-epoxycyclohexoxypropyl) sulfone, bis(2-methyl-3,4-epoxycyclohexoxyethyl) sulfone, bis(2,5-dimethyl-3,4-epoxycyclohexoxypropyl) sulfone, bis(2,3 - epoxycyclohexyl methoxyethyl) sulfone, bis(3,4-epoxycyclohexylethoxypropyl) sulfone, bis(lower alkyl substituted-3,4-epoxycyclohexylmethoxypropyl) sulfone, bis(3-oxatricyclo[3. 2.1.0$^{2,4}$]-6-octoxyethyl) sulfone, bis(3-oxatetracyclo[4. 4.0.1$^{7,10}$.0$^{2,4}$]-8-undecoxypropyl) sulfone, 2,3-epoxypropoxyethyl 3-oxatricyclo[3.2.1.0$^{2,4}$]-6-octoxypropyl sulfone, 2-ethyl-2,3-epoxyhexoxypropyl 3,4-epoxycyclohexoxyethyl sulfone, 9,10-epoxyoctadecoxypropyl 2-methyl-3,4-epoxycyclohexoxyethyl sulfone, bis(ethyl substituted-3-oxatetracyclo[4.4.0.1$^{7,10}$.0$^{2,4}$]-8-undecoxyethyl) sulfone, bis(dimethyl substituted - 3 - oxatetracyclo[4.4.0.1$^{7,10}$.0$^{2,4}$]-8-undecoxyethyl) sulfone, bis(lower alkyl substituted - 3 - oxatetracyclo[4.4.0.1$^{7,10}$.0$^{2,4}$]-8-undecoxyethyl) sulfone, and the like.

Additional diepoxides contemplated include, for example, omega, omega'-sulfonyldialkyl bis(vicinal-epoxycycloalkanecarboxylate), omega, omega'-sulfonyldialkyl bis(vicinal-epoxycycloalkylalkanoate), omega, omega'-sulfonyldialkyl bis (3 - oxatricyclo[3.2.1.0$^{2,4}$]octane-6-carboxylate), and the like. Illustrative examples of the above-mentioned diepoxy diester sulfones are 2,2'-sulfonyldiethyl bis(2,3-epoxycyclopentanecarboxylate)

4,4'-sulfonyldibutyl bis (3,4-epoxycyclohexanecarboxylate)
3,3'-sulfonyldipropyl bis(3,4-epoxycycloheptanecarboxylate)
2,2'-sulfonyldiethyl bis (2,3-epoxycyclopentylacetate)
4,4'-sulfonyldibutyl bis(2,3-epoxycyclopentylpropionate)
2,2'-sulfonyldiethyl bis(3-oxatricyclo[3.2.1.0²,⁴]octane-6-carboxylate, and the like.

Still other diepoxides contemplated include, for example, the 3-oxatetracyclo[4.4.0.1⁷,¹⁰.0²,⁴]undec-8-yl vicinal-epoxyalkanoates
the 3-oxatetracyclo[4.4.0.1⁷,¹⁰.0²,⁴]undec-8-yl vicinal-epoxycycloalkanecarboxylates
the 3-oxatetracyclo[4.4.0.1⁷,¹⁰.0²,⁴]undec-8-yl vicinal-epoxycycloalkylalkanoates
the 3-oxatetracylo[4.4.0.1⁷,¹⁰.0²,⁴]undec-8-yl 3-oxatricyclo[3.2.1.0²,⁴]octyl-6-alkanoates, and the like. Specific examples include
3-oxatetracyclo[4.4.0.1⁷,¹⁰.0²,⁴]undec-8-yl 2,3-epoxypropionate
3-oxatetracyclo[4.4.0.1⁷,¹⁰.0²,⁴]undec-8-yl 2,3-epoxybutyrate
3-oxatetracyclo[4.4.0.1⁷,¹⁰.0²,⁴]undec-8-yl 9,10-epoxystearate
3-oxatetracyclo[4.4.0.1⁷,¹⁰.0²,⁴]undec-8-yl 9,10,12,13-diepoxystearate
3-oxatetracyclo[4.4.0.1⁷,¹⁰.0²,⁴]undec-8-yl 2,3-epoxycyclopentanecarboxylate
3-oxatetracyclo[4.4.0.1⁷,¹⁰.0²,⁴]undec-8-yl 3,4-epoxycyclopentanecarboxylate
3-oxatetracyclo[4.4.0.1⁷,¹⁰.0²,⁴]undec-8-yl 4-methyl-2,3-epoxycyclopentanecarboxylate
3-oxatetracyclo[4.4.0.1⁷,¹⁰.0²,⁴]undec-8-yl 2-methyl-3,4-epoxycyclohexanecarboxylate
3-oxatetracyclo[4.4.0.1⁷,¹⁰.0²,⁴]undec-8-yl 3-oxatricyclo[3.2.1.0²,⁴]octane 6-carboxylate
3-oxatetracyclo[4.4.0.1⁷,¹⁰.0²,⁴]undec-8-yl 3-oxatricyclo-[3.2.1.0²,⁴]octyl-6-acetate
3-oxatricyclo[3.2.1¹,⁵.0²,⁴]octyl-6-methyl-3-oxatricyclo[3.2.1¹,⁵.0²,⁴]octane-6-carboxylate
tetraethylene glycol bis(3-oxatricyclo[3.2.1.0²,⁴]octane-6-carboxylate
ethylene glycol bis(3-oxatricyclo[3.2.1.0²,⁴]octane-6-carboxylate
bis(3-oxatricyclo[3.2.1.0²,⁴]octyl-6-methyl) maleate
ethyl bis(3-oxatricyclo[3.2.1.0²,⁴]octyl-6-methyl-1,2,4-pentadiene dioxide
dipentene dioxide
1,2,5,6-diepoxycyclooctane
butadiene dioxide
divinyl benzene dioxide
4,10-dioxatetracyclo[5.4.0.3,5.0¹,⁷.0⁹,¹¹]undecane
bis-2,3-epoxycyclopentyl 4,8-dioxatricyclo[5.1.0.0³,⁵]octane
1,2,4,5-diepoxycyclohexane
1,2,3,4,5,8-hexahydro-6,7,9,10-diepoxynaphthalene
6-epoxyethyl-3-oxatricyclo[3.2.1.0²,⁴]octane
and the like.

The diepoxy diester sulfones can be prepared by the reaction of, for example, omega, omega'-thioalkanol bis(cycloalkenecarboxylate), omega, omega'-thioalkanol bis(bicycloalkenylcarboxylate), and the like, with at least four mols of peracetic acid per mol of sulfide reagent. In this reaction, the sulfide moiety, i.e., —S—, is oxidized to the sulfonyl group, i.e., —SO₂—, and oxirane oxygen is introduced at the site of both carbon to carbon double bonds of the sulfide reagent. The omega, omega'-thiodialkanol di(unsaturated esters), in turn, can be prepared by the diesterification of stoichiometric quantities of a thiodialkanol, e.g., thiodigylcol, 3,3'-thiodipropanol, 8,8'-thiodioctanol, and the like, with an unsaturated organic acid, e.g., 3-cyclohexenecarboxylic acid, bicyclo[2.2.1]-5-heptene-2-carboxylic acid, and the like, in toluene or other appropriate inert organic media, using a sulfuric acid catalyst, and heating under reflux until the water formed by the reaction is completely removed as the lower layer of the distillate. The catalyst is then neutralized with an excess of sodium acetate, and after filtration, the esterification product is distilled, recovering the corresponding omega, omega'-thiodialkanol di(unsaturated ester).

Further contemplated diepoxides include diglycidyl acetal, 4-(3,4-epoxy-6-methylcyclohexymethyl)-3,5,8-trioxabicyclo[5.1.0]octane
3-epoxyethyl-spiro[5,5]-2,4-dioxa-9,10-epoxyundecane
4-(3,4-epoxybutyl)3,5,8-trioxabicyclo[5.1.0]octane
4-pentenal-di-(6-methyl-3,4-epoxycyclohexylmethyl) acetal
2-propyl-4,5-di-(1-methyl-1,2-epoxyethyl)-1,3-dioxolane
4-(6'-tricyclo[3.2.1¹,⁵.0²,⁴]3'-oxatricyclo)3,5,8-trioxobicyclo[5.1.0]octane
bis(6-methyl-3,4-epoxycyclohexylmethyl)formal, bis(3,4-epoxycyclohexylmethyl) formal and the like.

Still other suitable diepoxides are epoxidized stearates such as, for instance:

ethylene glycol bis(9,10-epoxystearate)
2-ethyl-2,3-epoxyhexyl-9,10-epoxystearate
2-ethyl-1,3-hexanediol bis (9,10-epoxystearate)
3,4-epoxy-6-methylcyclohexylmethyl-9,10-epoxystearate
2-ethylhexyl mono- and di-epoxystearates from Aliphat 44-A or from Neo-Fat 3-R,
alkyl 9,10,12,13-diepoxystearate
3-methyl-1,5-pentanediol bis(9,10-epoxystearate)
2-ethyl-1,5-pentanediol bis(9,10 epoxystearate)
9,10-epoxystearyl-9,10-epoxystearate
propylene-1,3-bis(3,4-epoxybutanoate)
2-ethylhexane-1,3-bis(3,4-epoxybutanoate)
4,5-epoxypentyl-4,5-epoxypentanoate
epoxidized 3-methyl-1,5-pentanediol adipate-4-pentanoate
ethyl 2,3,4,5-diepoxyhexanoate
methyl 2,3,4,5-diepoxyhexanoate
2,3,4,5-diepoxyhexanoic acid
1,5-pentanediol bis(5,6-epoxy-3,3,5-trimethylhexanoate)
1,5-pentanediol bis(2,3-epoxy-2-ethyl hexanoate)
3,4-epoxy-6-methylcyclohexymethyl-2,3-epoxy-2-ethylhexanoate.

Still other diepoxides include bis(2,3 - epoxybutylphenyl) - 2 - ethylhexyl phosphate, diethyl bis(2,3-epoxypropoxy) silane, epoxide ester of soybean oil alcohols, alkyl ester of epoxidized safflower oil fatty acids, alkyl ester of epoxidized tall oil fatty acids, nonylphenyl epoxytallate, 1,2,5,6 - diepoxy - 2,5 - dimethylhexane-3,4-diol, 3-methyl-1,5-pentanediol bis (4,5-epoxyvalerate), 2,3-epoxybutyl - 2,3 - epoxybutyrate, N,N' - ethylene bis(4,5-epoxycyclohexane-1,2-dicarboximide), N,N'-ethylene bis(3-oxatricyclo[3.2.1¹,⁵.0²,⁴] - octane - 6-carboxamide), diglycidyl carbonate, di(2-methylglycidyl) carbonate, bis(3,4-epoxy-6-methylcyclohexylmethyl) carbonate, glycidyl-2,3-epoxy-2 - ethylhexyl carbonate, glycidyl 2,3 - epoxycyclopentyl carbonate, and the like.

Additional diepoxides are: 1,2–5,6-diepoxycyclohexane, 1,2–4,5-diepoxycyclopentane, 2,3-dimethyl butadiene dioxide, 1,2-diglycidyloxydioxane, and diepoxydioxane.

Many of the foregoing diepoxides can be generally described as having the formula

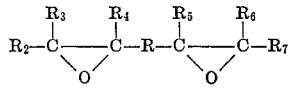

wherein R can be a bond between adjacent carbon atoms or a divalent organic group composed entirely of carbon and hydrogen such as alkylene, cycloalkylene, alkenylene and arylene groups; or a divalent organic group composed entirely of carbon, hydrogen and oxygen such as groups containing at least one ester structure, including monoesters, diesters, polyesters, unsaturated esters; or groups containing at least one ether linkage including diethers, cyclic ethers, and unsaturated ethers, or groups containing a glycol residue; or a divalent organic group composed entirely of carbon, hydrogen and nitrogen such as groups containing amide structures such as a diamide grouping; or a divalent group containing a structure composed of carbon and oxygen such as a carbonate grouping; or a divalent inorganic group containing a structure composed of oxygen and a nonmetal such as a phosphate or a sulfone group, or a silane group;

$R_2$, $R_3$, $R_6$ and $R_7$ can be hydrogen, a monovalent organic group, such as an alkyl group e.g. a methyl, ethyl or propyl group, or a monovalent organic group such as an ester containing group or an acid containing group or a divalent organic group such as an alkylene, alkylidene or cycloalkylene group or a divalent ester containing group; and $R_4$ and $R_5$ can behydrogen or a monovalent or divalent group e.g. alkyl such as methyl, ethyl, and neopentyl or aryl such as phenyl or alkylene, alkylidene or arylene.

The preferred diepoxides are those wherein each of the oxirane groups is connected to an electron donating substituent which is not immediately connected to the carbon atoms of that oxirane group. These diepoxides have both of the oxirane groups corresponding to the formula

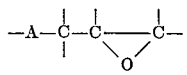

wherein A is an electron donating substituent such as

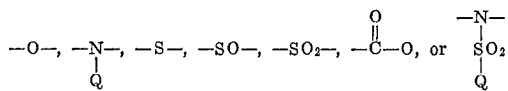

and Q is a saturated hydrocarbon radical, as saturated is defined above, e.g. an alkyl, cycloalkyl, aryl or aralkyl group.

Among suitable epihalohydrins and mixtures thereof which with epoxides can be reacted with dihydric phenols to produce the thermoplastic polyhydroxyethers of this invention are those having the general formula:

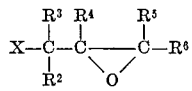

wherein $R^2$, $R^3$, $R^4$, $R^5$, and $R^6$ which can be the same or different are hydrogen or organic radicals such as alkyl, cycloalkyl, aryl, alkylene and arylene and X is a halogen atom, i.e., chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

The rubber modified composition of this invention can be prepared by conventional rubber and/or thermoplastic blending techniques such as are ordinarily used to mix thermoplastic resin or rubber composition components and which provide intimate homogenization of the blend. It is preferred to carry out at least a portion of the mixing under conditions of temperature, a shear sufficient to flux the polyhydroxyether i.e. sufficient to cause the resin to flow under the coacting influence of heat and shear, to ensure good homogeneity. This portion of the mixing is advantageously effected in a Banbury mixer or two-roll mill.

The amounts of rubber incorporated in the thermoplastic polyhydroxyether is not narrowly critical with wide ranges of concentration providing advantageous though different property differences. For example as little as three or less parts by weight of rubber down to about 0.5 parts per 100 parts by weight of the thermoplastic polyhydroxyether imparts improved toughness to the polyhydroxyether rendering it suitable for numerous applications where ability to take impact and stress are prime requisites. Incorporation of greater amounts of rubber in the thermoplastic polyhydroxyether, up to about 100 parts by weight of rubber per 100 parts by weight of thermoplastic polyhydroxyether progressively increase the flexibility of the polyhydroxyether opening new vistas of usefulness.

Within the above broad ranges of rubber concentration it has been demonstrated that stress rupture resistance of the polyhydroxyether, both flexural and in tension is improved. Surprisingly this stress rupture resistance improvement phenomenon is manifested in a wide variety of chemically active environments. Notable is the improvement in stress rupture resistance to acetic acid and sulfuric acid environments, both of which normally attack rubber and polyhydroxyether. The combination exceeds the stress rupture resistance of either component in acetic acid and sulfuric acid.

Rubber, moreover, appears to be unique among additives in affording this improvement since materials such as silica, calcium carbonate, talc, diatomaceous earth and the like do not alter chemical resistance. For example, compositions comprising 100 parts by weight of thermoplastic polyhydroxyether and 10 parts by weight of one of colloidal silica, diatomaceous earth, and fibrous talc failed the flexural stress rupture test in times equal to those of the control.

Rubber used for improving stress rupture resistance properties is ordinarily employed in amounts of from about 5 to about 50 parts by weight per 100 parts by weight of the thermoplastic polyhydroxyether. Preferred for optimum combinations of physical properties, such as heat distortion temperature, tensile strength and tensile modulus and stress rupture resistance are mixtures of 100 parts by weight of thermoplastic polyhydroxyether with from 7.5 to 35, particularly from 7.5 to 20 parts by weight of a rubber.

The following examples illustrate improvement in stress rupture resistance of thermoplastic polyhydroxyether by addition of rubber. All parts and percentages are by weight unless otherwise stated.

Reduced viscosity was in all examples determined at 25° C. using a 0.2 gram sample of the thermoplastic polyhydroxyether dissolved in 100 milliliters of tetrahydrofuran.

Melt flow was determined at 220° C. and 44 pounds/square inch pressure according to ASTM 1238–57T unless otherwise stated.

The equipment used was a 350 gallon stainless steel autoclave having a bottom outlet and provided with an agitator, reflux condenser, and a temperature sensing device. There was placed in the autoclave:

| | Lbs. |
|---|---|
| 2,2-bis(4-hydroxyphenyl)propane | 400 |
| Ethanol | 370 |
| Aqueous sodium hydroxide (24.1%) | 320 |
| Epichlorohydrin | 163.95 |

The reaction mixture was held for 16 hours at 29–32° C. and then heated to reflux (80° C.) over the course of one hour. After one hour of holding at 80° C. there was added 80 lbs. of a 6:4-toluene:n-butanol mixture over the course of one hour. The total reaction time at 80° C. was two and one half hours. The polymerization was then terminated with 12 pounds of phenol dissolved in 120 pounds of the 6:4 toluene:n-butanol mixture. After holding an additional two hours at 80° C., the reaction mass was cooled to 60° C. and there was added with agitation 350 pounds of water and 1427 pounds of the 6:4-toluene:n-butanol solvent mixture. After cooling to 30° C., the reaction mixture/solvent mass was permitted to settle. The lower aqueous layer which developed was drained off. The upper organic layer was washed with water containing 4 percent n-butanol. The weight ratio of water to the organic layer was 1:5. After separation of the water layer, the organic layer was acidified with 6 pounds of 85 percent phosphoric acid dissolved in the 350 pounds of water containing 4 percent n-butanol. The polymer-solvent layer was then further washed four times with water in the same ratio as above (1:5). The polymer was isolated, by stripping off volatiles in a heated twin screw mill.

Tensile stress rupture resistance

Example 1

A polyhydroxyether prepared as above and having a melt flow of 2.3 was fluxed on a 2 roll mill and 10 parts of polyisobutylene rubber per 100 parts of the polyhydroxyether was blended in. After milling to homogeneity, the material was sheeted and compression molded into 0.020 inch plaques. The molded plaques were made into tensile test specimens 2½ inches long by ⅝-inch wide and having a ½-inch radius arcuate notch cut into either side so as to form a neck 0.125 inch wide in the center of the test specimen. This specimen was stressed in tension at 3,000 p.s.i. while immersed in nonyl phenoxy polyoxyethylene ethanol. The specimen ruptured after 97.1 hours. A control specimen identically prepared and tested, except that the polyhydroxyether did not contain the rubber, failed in only 4.3 hours.

Example 2

Example 1 was duplicated except that the immersing chemical was lemon oil and the tensile stress was 1,000 p.s.i. The rubber modified specimen resisted rupture for 0.4 hour. The control specimen failed in less than 0.1 hour, the lower limit of the test.

Example 3

Following the procedure of Example 1 there was prepared a blend of a polyhydroxyether prepared as above and having a melt flow of 2.6 and 20 parts of nitrile rubber per 100 parts of the polyhydroxyether. Tensile test specimens were prepared and tested as in Example 2. The specimen of this example resisted rupture for 6.2 hours. The control failed in less than 0.1 hour.

Example 4

Example 1 was duplicated but substituting as the immersing chemical sulfuric acid. The rubber modified specimen had greater stress rupture resistance than the control.

Example 5

Example 1 was duplicated but substituting as the immersing chemical acetic acid. The rubber modified specimen had greater stress rupture resistance than the control.

Example 6

Example 1 was duplicated but substituting as the immersing chemical gasoline. The rubber modified specimen had greater stress rupture resistance than the control.

Example 7

The procedure of Example 1 was followed in preparing a composition comprising the polyhydroxyether and per 100 parts of the resin, 20 parts of polyisobutylene. Testing was then carried out on the rubber modified specimen and a control in lemon oil as in Example 2. The specimen of this example resisted stress rupture for 2.8 hours in contrast to the control failing in less than 0.1 hour.

Example 8

Example 1 was duplicated using the rubber modified polyhydroxyether of Example 7 and substituting acetic acid as the immersing chemical and using 3,000 p.s.i. as the tensile strength. The specimen of this example resisted stress rupture for 25.4 hours. The control failed in less than 0.1 hour.

Example 9

Example 8 was duplicated by substituting as the immersing chemical sulfuric acid. The specimen of this example had greater stress rupture resistance than the control.

Example 10

Example 8 was duplicated but substituting as the immersing chemical nonyl phenoxy polyoxyethylene ethanol. The specimen of this example had greater stress rupture resistance than the control.

Example 11

Example 8 was duplicated but substituting as the immersing chemical gasoline. The specimen of this example had greater stress rupture resistance than the control.

Example 12

Using the procedure of Example 1 polyhydroxyether was modified by blending in about 10 parts per 100 parts of polyhydroxyether of a styrene/butadiene rubber containing about 20 percent combined styrene. Test specimens were immersed in gasoline under a 3,000 p.s.i. tensile stress. The rubber modified specimen resisted stress rupture for 0.6 hour. The control failed in less than 0.1 hour.

Example 13

Example 12 was duplicated but substituting as the modifying rubber, nitrile rubber. The specimen of this example had greater stress rupture resistance than the control.

Example 14

Example 12 was duplicated but substituting as the modifying rubber a chlorosulfonated polyethylene. The specimen of this example had greater stress rupture resistance than the control.

Flexural stress rupture resistance

Example 15

Following the procedure of Example 1 a thermoplastic polyhydroxyether prepared as above and having a melt flow of 6.5 was blended with 7.5 parts of polyisobutylene rubber per 100 parts of the polyhydroxyether. After homogeneity was achieved in the blend, the material was sheeted and compression molded into 0.125 inch plaques. Test bars ½ inch by 5 inches by 0.125 inch were prepared and immersed in gasoline under flexural stress. The stress was achieved by supporting the test bars at 2 points each ½ inch from opposite ends of the bar and applying a 5,000 p.s.i. flexural stress at the center of the bar. The test bar of this example resisted rupture for 0.5 hour. The control failed in less than 0.1 hour.

Example 16

Example 15 was duplicated but substituting as the immersing chemical sulfuric acid. The test bar of this example resisted rupture for 3.3 hours. The control failed in 0.6 hour.

Example 17

Following the procedure of Example 15, a blend of polyisobutylene and polyhydroxyether was prepared containing 15 parts of the rubber per 100 parts of the polyhydroxyether. Test bars were prepared and tested as in Example 14. The test bars of this example resisted rupture for 3.2 hours. The control failed in less than 0.1 hour.

Example 18

Example 16 was duplicated but using the rubber modified polyhydroxyether of Example 17. The test bars of this example resisted rupture for 36.7 hours. The control failed in 0.6 hour.

Data from the above examples are presented in Table I. Other data similarly obtained using various chemically active environments are also presented for some compositions.

TABLE I.—ENVIRONMENTAL STRESS RUPTURE IN TENSION

| | Rubber Conc.[1] | Hrs. to Failure in— | | | | |
|---|---|---|---|---|---|---|
| | | Gasoline (3,000 p.s.i.) | 60% H$_2$SO$_4$ (3,000 p.s.i.) | 40% Acetic (3,000 p.s.i.) | Lemon Oil (1,000 p.s.i.) | Igepal[2] (3,000 p.s.i.) |
| Control | | <0.1 | 0.6 | <0.1 | <0.1 | 4.3 |
| Polyisobutylene | 10 | 0.1 | 1.6 | 0.8 | 0.4 | 97.1 |
| Do | 20 | 0.4 | 1.1 | 25.4 | 2.8 | 12.2 |
| GR-S rubber | 10 | 0.6 | | | | |
| Nitrile rubber | 10 | 0.4 | | | | |
| Polybutadiene | 10 | 0.8 | | | 0.4 | |

Environmental Stress Rupture in Flexure

| | Rubber Conc.[1] | (Hrs. to Failure at 5,000 p.s.i.) | | | | |
|---|---|---|---|---|---|---|
| | | Gasoline | 60% H$_2$SO$_4$ | 40% Acetic | Lemon Oil | Igepal |
| Control | | <0.1 | 0.6 | 0.1 | <0.1 | 52.8 |
| Polyisobutylene | 7½ | 0.5 | 3.3 | | | 54.7 |
| Do | 10 | 0.7 | 27.1 | 1.0 | 0.7 | |
| Do | 15 | 3.2 | 36.7 | 0.5 | 1.4 | |
| GR-S rubber | 7½ | 0.8 | 1.1 | | | 59.1 |
| Do | 10 | 1.5 | 1.9 | | 0.6 | |
| Do | 15 | 2.3 | 2.8 | 1.4 | 3.9 | |
| Nitrile rubber | 20 | | | | 6.2 | |

[1] Per 100 parts thermoplastic polyhydroxyether.
[2] Nonyl phenoxy polyoxyethylene ethanol.

The above described thermoplastic polyhydroxyethers can be rendered flame retardant by incorporating therein a mixture of a halogen carrier and an aromatic halide.

Typical of the halogen carriers conventionally used as components of flame retarded thermoplastic resin compositions and useful herein are metal oxides and sulfides. Among the metal oxides and sulfides, those deserving of special mention are the oxides and sulfides of antimony, arsenic and bismuth, i.e. metals of the VA group of the Deming Periodic Table (Handbook of Chemistry and Physics, Chemical Rubber Publishing Co., 35th ed., p. 389).

As the aromatic halides herein there can be used aromatically unsaturated organic materials having substituted on one or more of the aromatic rings one or more halogen substituents, i.e. fluoro, chloro, bromo or iodo groups. Among the aromatic halides those deserving of special mention are the mono- and polychloro and/or bromo substituted monomeric mononuclear aromatic compounds, such as for example, chlorinated benzenes, e.g. hexachlorobenzene, chlorinated and/or brominated monomeric polynuclear phenyl compounds, e.g. chlorinated and/or brominated biphenyls, terphenyls, tetraphenyls and higher polyphenyls. Preferred monomeric aromatic halides are chloro derivatives of polynuclear phenyl compounds, particularly chlorinated biphenyls and terphenyls containing from about 40 percent to 70 percent by weight combined chlorine.

Among the aromatic halides others also deserving of mention are the halogenated thermoplastic polyhydroxyethers, having the repeating unit

wherein G is the radical residuum of a halogenated dihydric phenol, preferably a halogenated polynuclear dihydric phenol and E is the radical residuum of an epoxide selected from mono- and diepoxides and contains from one to two hydroxyl groups.

These materials are useful as flame-retardant components in a complete range of molecular weights and typically have molecular weights providing reduced viscosities measured as above of from 0.02 to 10 and preferably for minimum effect on ultimate composition properties from 0.075 to about 1.0 and particularly about 0.38 measured as a 0.2 gram sample in 100 milliliters of tetrahydrofuran at 25° C.

The halogenated thermoplastic polyhydroxyethers used as aromatic halides in the flame retarded compositions of the present invention can be prepared by the above described technique for polyhydroxyethers generally by using as the dihydric phenol a halogenated dihydric phenol and preferably by using a halogenated-dihydric polynuclear phenol.

Illustrative of halogenated dihydric phenols which can be reacted with mono- and diepoxides, such as are noted above, to produce the halogenated thermoplastic polyhydroxyethers useful as aromatic halides in the present invention are halogenated dihydric phenols having the general formula

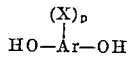

and halogenated polynuclear phenols having the general formula:

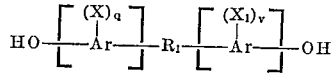

wherein: Ar is an aromatic divalent hydrocarbon radical such as naphthylene and phenylene with phenylene being preferred as flame-retardance imparting polyhydroxyethers; X and X$_1$ which can be the same or different are halogen atoms, i.e., chlorine, bromine, iodine, or fluorine. It is to be understood that whenever there are substituents exclusive of the hydroxyl groups on the sole or either or both of the aromatic divalent hydrocarbon groups, these substituents can be the same or different; p, q and v are integers having a value of from 0 to a maximum value corresponding to the number of hydrogen atoms on the aromatic ring (Ar) which can be replaced by substituents and can have the same or different values; and R$_1$ is a bond between adjacent carbon atoms as in dihydrocyclophenyl or is a divalent radical as described above for thermoplastic polyhydroxyethers.

Particularly preferred are halogenated dihydric polynuclear phenols having the general formula:

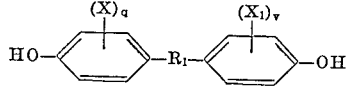

wherein X, X$_1$ are as previously defined, q and v have values of from 0 to 4 inclusive and R$_1$ is an alkylene or alkylidene group, preferably having from 1 to 3 carbon atoms inclusive or R$_1$ is a saturated group such as is obtained from compounds such as 4-vinylcyclohexene and dipentene or its isomers by reaction with two moles of phenol per mole of the compound. R$_1$ preferably contains from 1 to 9 carbon atoms.

Examples of specific halogenated dihydric phenols include halogenated dihydroxy benzenes e.g. chloro and bromo derivatives of resorcinol, catechol, and hydroquinol among others; the halogenated bis(hydroxyphenyl) alkanes such as 2,2-bis-(3,5-dichloro-4-hydroxyphenyl) propane, bis(4-hydroxy-2-chlorophenyl) ethane and other halogen derivatives of bis(hydroxyphenyl) alkanes such as those listed previously, especially the chloro and bromo derivatives of these compounds.

The halogenated di(hydroxyphenyl) sulfones such as the chloro and bromo derivatives thereof e.g., 5'-chloro-2,4'-dihydroxydiphenyl sulfone, 5'-chloro-4,4'-dihydroxydiphenyl sulfone, 3'-chloro-4,4-dihydroxydiphenyl sulfone, 3'-chloro-4,4'-dihydroxydiphenyl sulfone and the like; the halogenated di(hydroxyphenyl) ethers such as the fluoro, chloro and bromo derivatives thereof e.g. bis(4-hydroxy-3-chlorophenyl) ether, bis(4-hydroxy-3-fluorophenyl) ether, bis(4-hydroxy-3-bromophenyl) ether, bis(4-hydroxy-3-chloronaphthyl) ether, and the like.

Also suitable are the halogen derivatives of 1-(4-hydroxyphenyl) - 1 - [(4-hydroxyphenyl) - cyclohexyl]-ethane, 1,3,3-trimethyl-1-(4-hydroxyphenyl)-6-hydroxyindane, 2,4-bis-(4-hydroxyphenyl)-4-methylpentane, the bisphenol reaction products of dipentene or its isomers and phenols and bisphenol reaction products of 4-vinylcyclohexene and phenols, and the like, particularly the chloro derivatives thereof.

Mixtures of halogenated dihydric phenols can also be employed and wherever the term "halogenated dihydric phenol" is used herein, mixtures of these halogenated compounds are intended to be included.

In addition to the halogenated thermoplastic polyhydroxyethers prepared directly from a halogen substituted dihydric phenol, such as are above enumerated and a mono- or diepoxide, halogenated thermoplastic polyhydroxyethers otherwise produced also impart flame retardance to thermoplastic polyhydroxyether in conjunction with metal compound halogen carriers. For example, a formed thermoplastic polyhydroxyether can be directly halogenated by conventional techniques such as by dissolving the resin in tetrahydrofuran or methyl ethyl ketone and introducing a halogen into the solution as a solution or a gas or solid suitably in the presence of a catalyst for the halogenation, or by intimately blending finely divided suspended solid polyhydroxyether and gaseous or liquid halogen suitably with the additional use of an initiator, such as light. Further, suitable halogenated polyhydroxyethers are prepared by the reaction of halogen containing dihydric phenols such as are above enumerated and diglycidyl ethers of halogenated dihydric phenols. In this reaction the respective reactants can be mono-, di-, tri- or tetra-halo substituted and are preferably di or tetra chloro substituted. For purposes of imparting flame retardance the halogenated polyhydroxyethers prepared by foregoing methods are equivalent.

The use of halogenated thermoplastic polyhydroxyethers as aromatic halides offers considerable advantages over other aromatic halides because the compatibility of the former additive with ordinary polyhydroxyether is greater and the heat distortion and glass transition temperatures of the final flame retarded composition remain high. Processing advantages are also realized since the halogenated thermoplastic polyhydroxyether is not as volatile as monomeric aromatic halides and is more easily blended with ordinary thermoplastic polyhydroxyethers.

Quite surprisingly the concentration of halogenated polyhydroxyether in thermoplastic polyhydroxyether compositions can be much less in terms of halogen content than with monomeric aromatic halides and still provide effective flame retardation. Preferred halogenated polyhydroxyethers are chlorinated and contain at least 15 percent by weight combined chlorine and preferably contain from 20 to 50 percent and more by weight of combined chlorine.

The term "flame-retarded" is used herein in general to describe thermoplastic materials comprising polyhydroxyether and a flame-retardant mixture which exhibit less tendency to burn than unmodified polyhydroxyether.

Various standards of degree of flame-retardance have been developed to measure suitabiilty of flame-retarded thermoplastic for different end use applications.

(I). The Underwriters' Laboratories has suggested a test method wherein a vertically suspended $\frac{1}{16}''$ x $\frac{1}{2}$ x 5'' bar is contacted at the bottom with a bunsen burner flame for ten seconds and the time of burning measured and then immediately subjected to flame again for ten seconds and the burning time again measured. The aggregate burning time for the two ignitions must be less than 25 seconds for a material to be classified Self Extinguishing Group I and no drip can occur. Such compositions are prepared below.

Another test is that proposed by International Business Machines Corporation wherein a $\frac{1}{8}''$ x $\frac{1}{2}''$ x 5'' bar is suspended vertically and ignited once for ten seconds and the time of burning noted. The time to extinguishment must not exceed five seconds.

Another test is ASTM D–635–56T which classifies thermoplastic materials as:

(A) "Non-Burning" if a $\frac{1}{8}''$ x $\frac{1}{2}''$ x 5'' bar horizontally suspended and tilted so that the transverse axis is at 45°, will not ignite following two successive 30 second subjectings to flame at the lower end thereof.

(B) "Self-Extinguishing" if the specimen in (A) will extinguish the flame within 4 inches of the ignited end; or (C) "Burning" where extinguishment is not accomplished within 4 inches.

Individual applications require formulation variation taking into consideration degree of flame-retardance needed. A lamp cord needs only minimal flame retardance, e.g., only "Self-Extinguishing" under ASTM 635–56T; business machine housings and components need maximum flame-retardance, e.g., "Self-Extinguishing Group I" under the Underwriters' Laboratories test.

Amounts of flame retardant mixture ranging from 10 to 40 parts by weight per 100 parts by weight of the polyhydroxyether are broadly satisfactory, although particular emphasis on a certain desired property will dictate a concentration tending to one or the other end of this range. That is, in an application where flame retardance is paramount and physical properties such as impact strength and heat distortion temperature are less significant, a concentration of flame retardant mixture on the high side of the above broad range is desirable. Conversely, where only minimal flame retardance is necessary and good impact strength and high heat distortion temperature are of considerable importance, a concentration of flame-retardant mixture on the low side of the above broad range will be desirable.

The above range of concentration, 10 to 40 parts of the flame-retardant mixture, is preferably composed of from 5 to 20 parts each of a monomeric aromatic halide and the halogen carrier. In general the concentration of either component in the composition should not be less than 5 parts by weight per 100 parts by weight of polyhydroxyether where a monomeric aromatic halide is employed and not below 5 parts and 6 parts respectively for the halogen carrier and the aromatic halide where the aromatic halide is a halogenated polyhydroxyether per 100 parts by weight of polyhydroxyether. Generally their individual concentrations will be considerably less than the desirable maximum of 20 parts by weight and the total of the two components will be less than 35 parts by weight.

Where a halogenated polyhydroxyether is used as the aromatic halide, from 10 to 20 parts thereof with 10 to 20 parts of the halogen carrier, the two totalling preferably about 30 parts is sufficient to provide "Self-Extinguishing Group I" flame retardance properties.

Also to be considered in determining optimum flame-retardant concentration is the particular degree of flame retardance required, i.e., for what application is the flame-retarded composition intended.

The amount of flame-retardance desired and the required corresponding concentration of the flame-retardant mixture and of each component therein is best considered in terms of specific test in the art as described above. Similarly, the amount of rubber used in conjunction with a given flame-retarded polyhydroxyether to inhibit drip will vary with the quantity of flame-retardant which as stated above is dependent on flame-retardance desired for the given application.

These variables are most easily presented in tabular form.

TABLE II

| Component | All Parts by Weight | | | |
|---|---|---|---|---|
| | UL Group I | IBM | ASTM Non-burning | ASTM Self-extinguishing |
| Polyhydroxyether | 100 | 100 | 100 | 100 |
| Flame-retardant mixture | 18-33 | 16-36 | 14-30 | 10-24 |
| Monomeric aromatic halide | 9-15 | 8-14 | 7-12 | 5-9 |
| Halogenated polyhydroxyether | 10-20 | 10-18 | 8-15 | 6-12 |
| Halogen carrier | 9-18 | 8-18 | 7-15 | 5-12 |
| Rubber compound | 4-8 | 4-8 | 3-7 | 2-5 |

Factors to be considered in selecting a particular combination of rubber, aromatic halide and halogen carrier include:

(A) Greater flame-retardance achieved through
(1) use of greater amounts of flame retardant mixture; or
(2) use of relatively greater amounts of the aromatic halide at a given flame-retardant mixture concentration; or
(3) use of a higher halogen content aromatic halide at a given concentration thereof in the flame retardant mixture; and (B) Improved physical properties achieved through
(1) use of lesser amounts of flame-retardant mixture; or
(2) use of increased amounts of rubber compound; or
(3) use of lesser amounts of aromatic halide (higher heat distortion); or
(4) use of lesser amounts of halogen carrier (higher impact strength); and (C) Improved drip-inhibition achieved through use of increased amounts of rubber compound.

The flame-retarded and non-flame retarded, rubber modified thermoplastic polyhydroxyether compositions of this invention can contain various stabilizers, colorants, lubricants and fillers, and other conventional additives for thermoplastic resins.

The flame retarded, rubber containing compositions of this invention can be prepared by the conventional thermoplastic compounding techniques ordinarily used to mix thermoplastic resin composition components and which provide intimate homogenization of the blend. As with other blending operations above-mentioned it is preferred to carry out at least a portion of the mixing under conditions of temperature and shear sufficient to flux the polyhydroxyether resin. This portion of the mixing is advantageously effected in a Banbury mixer or two-roll mill.

The flame-retarded and non-flame retarded rubber modified thermoplastic polyhydroxyether compositions described herein can be compression, injection or blow-molded, formed or extruded into various shapes and contours typical of thermoplastics generally.

The invention is illustrated by the following examples wherein all parts and percentages are by weight unless otherwise stated.

Example 19

The polyhydroxyether used had been prepared by reacting together in an alkaline medium approximately equimolar amounts of epichlorohydrin and 2,2-bis-(4-hydroxyphenyl)-propane to give a thermoplastic polyhydroxyether having the repeating unit

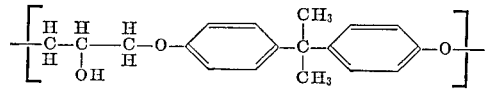

and a reduced viscosity of .45 as a 0.2 gram sample in 100 milliliters of tetrahydrofuran at 25° C. One hundred parts of the above polyhydroxyether in granulated form, 13 parts of chlorinated biphenyl (68% combined chlorine content), 17 parts antimony oxide ($Sb_2O_3$) and 5 parts GRS styrene-butadiene rubber (23% styrene) were charged to a drum mixer and tumbled for 10 min. until thoroughly mixed. The mixture was charged to a Banbury mixer and fluxed without steam on the jacket by the action of the rotors and ram. Banbury temperature did not exceed about 200° C. The mass was discharged from the Banbury mixer and sheeted on a two roll mill and then granulated.

Typical properties of thusly prepared compositions are as follows:

TABLE III

| Property | ASTM No. | Value |
|---|---|---|
| Tensile strength | D638-58T | 10,000–12,000 p.s.i. |
| Tensile modulus | D638-58T | 350,000–400,000 p.s.i. |
| Ultimate elongation | D638-58T | 50–100%. |
| Tensile impact str | | 350–400 ft. lbs./cubic inch. |
| Charpy impact str | D256-56T | 50–60 ft. lbs./inch. |
| Heat distortion temp | D648-45T | (264 p.s.i.) 78–81° C. |
| Dielectric constant ($10^6$ cycles) | D150-54T | 3.49. |
| Dissipation factor ($10^6$ cycles) | D150-54T | 0.023. |
| Specific gravity | D1505-57T | 1.32. |
| Color | | Opaque white. |
| Rockwell hardness | D785-51 | R 117. |

The composition prepared in Example 19 was tested for flame-retardance and degree of drip inhibition by the Underwriters Laboratories test described above.

This flame retarded polyhydroxyether had an aggregate burning time for the two consecutive 10 second ignitions of only 7 seconds, well below the allowable 25 seconds. No droplets were formed and no dripping occurred. This composition was "Self-Extinguishing Group I" by the Underwriters' Laboratories test.

Example 20

Example 19 was duplicated except that 11 parts of the antimony oxide and 11 parts of the chlorinated biphenyl were used as the flame-retardant mixture. This composition was rated "Non-Burning" under the ASTM tests.

Example 21

Example 19 was duplicated except that 7 parts of the antimony oxide and 7 parts of the chlorinated biphenyl were used as the flame-retardant mixture and only 4 parts of the rubber were used. This composition was rated "Self-Extinguishing" under the ASTM test.

Example 22

Example 19 is duplicated except that arsenious oxide ($As_2O_3$) is substituted for antimony oxide. A flame retarded, drip inhibited polyhydroxyether is obtained.

Example 23

Example 19 is duplicated except that bismuth oxide ($Bi_2O_3$) is used in place of antimony oxide. A flame retarded, drip inhibited polyhydroxyether is obtained.

Example 24

Example 19 is duplicated except that antimony sulfide ($Sb_2S_3$) is used in place of antimony oxide. A flame retarded, drip inhibited polyhydroxyether is obtained.

Example 25

Example 19 was duplicated except that only 3 parts of the styrene-butadiene rubber were used. This composition was rated "Self-Extinguishing Group I" and was otherwise equivalent in properties to the product obtained in Example 19 except for an increased tensile modulus and a slightly lowered impact strength attributable to the lower rubber content.

Example 26

Example 19 was duplicated except that 9 parts of the styrene-butadiene rubber were used. This composition was rated "Self-Extinguishing Group I" and was otherwise equivalent in properties to the composition of Example 19 except for increased impact strength and a slightly lowered tensile modulus attributable to the increased rubber content.

Example 27

Example 19 was duplicated except that 10 parts of the chlorinated biphenyl were used with the 13 parts of antimony oxide as the flame retardant mixture. This composition was rated "Non-Burning" under the ASTM test.

Example 28

Example 19 was duplicated except that 18 parts of the antimony oxide and 10 parts of the chlorinated biphenyl were used as the flame retardant mixture. This composition was rated "Self-Extinguishing Group I" by the Underwriter Laboratories test and was in all respects equivalent to the composition of Example 19. It will be noted that the decrease in chlorinated biphenyl concentration was compensated for by an increase in antimony oxide concentration. This illustrates that variations in composition of the flame-retardant mixture can be employed in this invention.

Example 29

Example 19 was duplicated except that chlorinated terphenyl (60% chlorine), 13 parts, was substituted for the 13 parts of chlorinated biphenyl. This composition was "Self-Extinguishing Group I" by the Underwriters Laboratories test and was otherwise equivalent to the composition of Example 19.

Example 30

Example 19 was duplicated except that a chlorinated biphenyl containing 42% combined chlorine was substituted for the 68% combined chlorine content biphenyl of Example 19. This composition was "Non-Burning" by the ASTM test.

Example 31

Example 19 was duplicated except that 5 parts of polyisobutylene rubber was substituted for the styrene/butadiene rubber. This composition was "Self-Extinguishing Group I" by the Underwriters Laboratories test and was otherwise equivalent to the composition of Example 19.

Example 32

Example 19 was duplicated except that 5 parts of polybutadiene rubber were substituted for the styrene/butadiene rubber. This composition was "Self-Extinguishing Group I" by the Underwriters Laboratories test and, except for a natural tan color, was otherwise identical to the composition of Example 19.

Example 33

Example 19 was duplicated except that 5 parts of polychloroprene rubber were substituted for the styrene/butadiene rubber. This composition was "Self-Extinguishing Group I" by the Underwriters Laboratories test and, except for a deep tan color, was otherwises identical to the composition of Example 19.

Example 34

Example 19 was duplicated except that 5 parts of acrylonitrile/butadiene rubber were substituted for the styrene/butadiene rubber. This composition was "Self-Extinguishing Group I" by the Underwriters Laboratories test and, except for a natural tan color, was identical to the composition of Example 19.

Example 35

Example 19 was duplicated except that 5 parts of chlorosulfonated polyethylene rubber was substituted for the styrene/butadiene rubber. This composition was "Self-Extinguishing Group I" by the Underwriters Laboratories test and, except for a natural tan color, was otherwise identical to the composition of Example 19.

Example 36

Example 19 is duplicated but using as the polyhydroxyether resin the reaction product of approximately equimolar amounts of epichlorohydrin and the bisphenol reaction product of 4-vinyl cyclohexene and phenol in a 1 to 2 mole ratio in an alkaline medium. There is obtained a flame-retarded, drip-inhibited polyhydroxyether resin composition.

Example 37

Example 19 was repeated but using as the polyhydroxyether resin the reaction product of approximately equimolar amounts of epichlorohydrin and the bisphenol of acetophenone in an alkaline medium. There is obtained a flame-retarded, drip-inhibited polyhydroxyether resin composition.

Example 38

Example 19 is duplicated but using as the polyhydroxyether resin the reaction product of approximately equimolar amounts of (a) a mixture of 2,2-bis(p-hydroxyphenyl) propane and the bisphenol of Example 37 and (b) epichlorohydrin in an alkaline medium. There is obtained a flame-retarded, drip-inhibited polyhydroxyether.

Example 39

Example 19 is duplicated but using as the polyhydroxyether resin the reaction product of approximately equimolar amounts of dihydroxy diphenyl sulfone and epichlorohydrin in an alkaline medium. There is obtained a flame-retarded, drip-inhibited polyhydroxyether.

Example 40

Example 19 is duplicated but using as the polyhydroxyether resin the reaction product of approximately equimolar amounts of the bisphenol of p-menthane and epichlorohydrin. There is obtained a flame-retarded, drip-inhibited polyhydroxyether.

Example 41

Example 19 is followed except that natural crepe rubber is used in place of the styrene/butadiene copolymer. There is obtained a flame-retarded, drip-inhibited polyhydroxyether resin composition.

Example 42

The following example illustrates use of a masterbatch in preparing the compositions of this invention.

The polyhydroxyether resin of Example 19 was used. Twelve parts of the resin were fluxed on a two roll mill with the rolls at 120°C. and 160°C. respectively. To the fluxed resin there were added 5 parts of styrene/butadiene rubber (23% styrene), then 13 parts of antimony oxide and the mixture was worked for several passes. The worked masterbatch mass was sheeted and granulated. The masterbatch was tumbled with 88 parts of the same polyhydroxyether and 13 parts of the chlorinated biphenyl of Example 19, and then placed in a Banbury mixer. A polyhydroxyether composition having superior dispersion of rubber and flame retardant was obtained.

Properties, flame-retardance qualities and drip characteristics were as in Example 41 above.

Control I

To demonstrate the drip inhibiting function of the rubber component of the compositions of this invention, Example 19 was duplicated but omitting the rubber addition. The composition dripped badly upon ignition.

Control II

To demonstrate that the drip-inhibiting phenomenon occurring with combinations of polyhydroxyether resin and rubber does not occur with combinations of polyethylene resin and rubber, Example 19 was duplicated but substituting 100 parts of a polyethylene resin having a density of 0.95 gram/cubic centimeter and a melt index of 0.01 decigram/minute. The composition dripped badly upon ignition in all of the flame-retardance tests described above.

Example 43

One hundred parts of the polyhydroxyether prepared in Example 19 was fluxed on a two roll mill at roll temperatures of 120°C. and 160°C. There was blended into the polyhydroxyether on the mill 26 parts of a chlorinated polyhydroxyether of 2,2-bis(4-hydroxyphenyl) propane and epichlorohydrin having a reduced viscosity 0.38 measured as a 0.2 gram sample in 100 milliliters of tetrahydrofuran at 25°C. which had been chlorinated by passing chlorine gas through a solution of the polyhydroxyether. Combined chlorine content was about 34 percent. There was also milled in gradually and individually 13 parts of antimony trioxide ($Sb_2O_3$) and 5 parts GRS styrene/butadiene rubber (23% combined styrene). The mass was milled to homogeneity. The composition was tested for flame-retardance and degree of drip inhibition by the Underwriters' Laboratories test described above.

This flame retarded polyhydroxyether had an aggregate burning time for the two consecutive 10 second ignitions of less than 7 seconds, well below the allowable 25 seconds.

No droplets were formed and no dripping occurred. This composition was "Self-Extinguishing Group I" by the Underwriters' Laboratories test.

Other properties of the composition included:

TABLE IV

| Properties | ASTM No. | Value |
| --- | --- | --- |
| Heat distortion | D256-56T | (264 p.s.i.) 83° C. |
| Tensile strength | D638-58T | 9,000-11,000. |
| Tensile modulus | D638-58T | 350,000-400,000. |

Example 44

Example 43 was duplicated except that 10 parts of the chlorinated polyhydroxyether and 15 parts $Sb_2O_3$ was used. The combination was "Self-Extinguishing Group I."

Example 45

Example 44 was duplicated but substituting for the 10 parts of chlorinated polyhydroxyether, 10 parts of a polyhydroxyether from epichlorohydrin and 2,2-bis(3,5-dichloro-4-hydroxyphenyl) propane (combined chlorine=34%) having a reduced viscosity (measured as above) of over 0.60. A "Self-Extinguishing Group I" flame retarded, drip inhibited polyhydroxyether, composition was obtained.

Example 46

Example 44 is duplicated but substituting for the 10 parts of chlorinated polyhydroxyether, 10 parts of a polyhydroxyether from epichlorohydrin and 2,2-bis(3,5-dibromo-4-hydroxyphenyl) propane having a reduced viscosity (measured as above) of over 0.50. A flame retarded, drip inhibited polyhydroxyether composition is obtained.

Example 47

Example 44 was duplicated but substituting for the 10 parts of chlorinated polyhydroxyether, 30 parts of a polyhydroxyether from epichlorohydrin and 2,2-bis(3-chloro-4-hydroxyphenyl) propane (combined chlorine=14%) having a reduced viscosity (measured as above) of over 0.50. A "Self-Extinguishing Group I" flame retarded, drip inhibited polyhydroxyether composition is obtained.

Example 48

Example 44 was duplicated but substituting for the 0.38 reduced viscosity chlorinated polyhydroxyether a 0.075 reduced viscosity chlorinated polyhydroxyether. A "Self-Extinguishing Group I" flame retarded, drip inhibited polyhydroxyether composition is obtained.

Example 49

Example 44 was duplicated but substituting for the 10 parts of chlorinated polyhydroxyether 10 parts of a chlorine containing polyhydroxyether prepared as follows:

To a reaction vessel equipped with stirrer, thermometer and silica gel packed column there was charged 2,2-bis(4-hydroxyphenyl) propane (22.8 parts), diglycidyl ether of 2,2-bis(4-hydroxyphenyl) propane (49.2 parts) and o-dichlorobenzene (72.0 parts). To this mixture there was added 0.330 part of potassium hydroxide (85% KOH) dissolved in 3 parts of water. The mixture was heated to reflux (180°C.). Water was removed by the silica gel column. After 3 hours at 180°C. the thick solution obtained was diluted with chloroform and stirred overnight at room temperature. Coagulation of the polymer was effected with isopropanol in a Waring Blendor. The polymer was vacuum dried at 70°C. There was obtained 64.6 parts (90% yield) of an alternating polyhydroxyether copolymer having a reduced viscosity measured as a 0.2 gram sample in 100 milliliters of tetrahydrofuran at 25°C. of 0.67.

A "Self-Extinguishing Group I" flame retarded, drip inhibited polyhydroxyether composition was obtained.

Example 50

Example 49 is duplicated but substituting an alternating polyhydroxyether copolymer prepared from the diglycidyl ether of hydroquinone and 2,2-bis(3,5-dichloro-4-hydroxyphenyl) propane. Reduced viscosity of the chlorinated polymer is 0.45. The polyhydroxyether composition is "Self-Extinguishing Group I."

Example 51

Example 49 was duplicated but substituting an alternating polyhydroxyether copolymer prepared from the diglycidyl ether of 2,2-bis(3,5-dichloro-4-hydroxyphenyl) sulfone and 2,2-bis(3,5-dichloro-4-hydroxyphenyl) propane. A "Self-Extinguishing Group I," flame retarded, drip inhibited polyhydroxyether composition was obtained.

Example 52

Example 49 is duplicated but substituting a polyhydroxyether prepared by reacting 2.29 parts of 2,2-bis-(3,5-dichloro-4-hydroxyphenyl) propane, 1.15 parts of bis-(2,3-epoxycyclopentyl) ether and 0.030 parts of the disodium salt of 2,2-bis(4-hydroxyphenyl) propane (as hexahydrate) in a vessel at 235°C. for one hour. Reduced viscocity of this halogenated polyhydroxyether was 0.4 as a 0.2 gram sample in 100 milliliters of dimethylformamide at 25° C. A "Self-Extinguishing Group I," flame-retarded, drip inhibited polyhydroxyether composition is obtained.

Example 53

Example 52 is duplicated but substituting as the non-halogenated thermoplastic polyhydroxyether the product obtained by mixing 22.6 parts of 2,2-bis(4-hydroxyphenyl) propane, 40.0 parts of ethanol, 6.5 parts of water and 0.76 parts of the Bis A disodium salt and 8.83 parts of butadiene dioxide and heating at reflux (80°C.) for 2.5 hours and then after addition of solvent heating for an additional 24 hours. A "Self-Extinguishing Group I" flame-retarded, drip-inhibited polyhydroxyether composition is obtained.

Example 54

Example 52 is duplicated substituting the halogenated polyhydroxyether of Example 45. A "Self-Extinguishing Group I" flame retarded, drip-inhibited polyhydroxyether composition is obtained.

What is claimed is:
1. A flame retarded thermoplastic composition comprising:
   (a) 100 parts by weight of a thermoplastic polyhydroxyether substantially free of 1,2-epoxy groups and having repeating units of the general formula

$$\text{-}[D\text{-}O\text{-}E\text{-}O]_n\text{-}$$

wherein D is the radical residuum of a dihydric phenol, E is the radical residuum of epichlorohydrin n is an integer representing the degree of polymerization and is at least 30;
   (b) 2 to 10 parts by weight of a rubber compound selected from the group consisting of natural rubber, diene polymers, polyisobutylene and chlorosulfonated polyethylene; and
   (c) 7 to 40 parts by weight of a flame-retardant mixture comprising an aromatic halide having at least one halogen substituent on the ring and a halogen carrier selected from the group consisting of oxides and sulfides of metals of Group VA of the Deming Periodic Table.

2. The composition claimed in claim 1 comprising 10 to 35 parts by weight of a flame-retardant mixture consisting essentially of at least 5 parts by weight of a chlorinated terphenyl and at least 5 parts by weight of an oxide of a metal of Group VA of the Deming Periodic Table.

3. The composition claimed in claim 1 comprising 10 to 35 parts by weight of a flame-retardant mixture consisting essentialy of at least 5 parts by weight of a chlorinated biphenyl and at least 5 parts by weight of antimony oxide.

4. The composition claimed in claim 1 comprising 4 to 8 parts by weight of a styrene/butadiene rubber and from 18 to 38 parts by weight of a flame-retardant mixture consisting essentially of from 9 to 15 parts by weight of a chlorinated biphenyl containing from 40 to 70% by weight of combined chlorine and from 9 to 18 parts by weight of antimony oxide.

5. The composition claimed in claim 1 comprising 4 to 8 parts by weight of a polyisobutylene rubber and from 18 to 38 parts by weight of flame-retardant mixture consisting essentially of from 9 to 15 parts by weight of a chlorinated biphenyl containing from 40 to 70% by weight of combined chlorine and from 9 to 18 parts by weight of antimony oxide.

6. The composition claimed in claim 1 comprising 11 to 40 parts by weight of a flame-retardant mixture consisting essentially of at least 6 parts by weight of a halogenated polyhydroxyether having repeating units of the general formula $$\text{-}[D'\text{-}O\text{-}E\text{-}O]_n\text{-}$$

wherein D' is the radical residuum of a halogen substituted dihydric phenol, E is the radical residuum of epichlorohydrin and n is an integer representing the degree of polymerization and is at least 30 and at least 5 parts by weight of halogen carrier.

7. The composition claimed in claim 6 comprising 20 to 40 parts by weight of a flame-retardant mixture consisting essentially of from 10 to 20 parts by weight of chlorinated polyhydroxyether and from 10 to 20 parts by weight of an oxide of a metal of Group VA of the Deming Periodic Table.

8. The composition claimed in claim 6 comprising from 20 to 40 parts by weight a flame-retardant mixture consisting essentially of from 10 to 20 parts by weight of brominated polyhydroxyether and from 10 to 20 parts by weight of an oxide of a metal of Group VA of the Deming Periodic Table.

9. A thermoformed article fabricated from the composition claimed in claim 1.

10. Process for the preparation of flame-retarded thermoplastic compositions which includes the steps of:
   (a) adding to 100 parts by weight of a thermoplastic polyhydroxyether substantially free of 1,2-epoxy groups, and having repeating units of the general formula:

$$\text{-}[D\text{-}O\text{-}E\text{-}O]_n\text{-}$$

wherein D is the radical residuum of a dihydric phenol, E is the radical residuum of epichlorohydrin and n is an integer representing the degree of polymerization and is at least 30, 2 to 10 parts by weight of a rubber compound selected from the group consisting of natural rubber, diene polymers, polyisobutylene and chlorosulfonated polyethylene and 10 to 40 parts by weight of a flame-retardant mixture comprising an aromatic halide having at least one halogen substituent on the ring and a halogen carrier selected from the group consisting of oxides and sulfides of metals of Group VA of the Deming Periodic Table;
   (b) mixing the components together; and
   (c) heating the mixture of components until the polyhydroxyether fluxes and the mass of components becomes homogeneous.

References Cited

UNITED STATES PATENTS

| | | | |
|---|---|---|---|
| 3,177,089 | 4/1965 | Marshall et al. | 117—72 |
| 3,234,313 | 2/1966 | Miller et al. | 264—230 |
| 2,669,521 | 2/1954 | Bierly. | |
| 2,718,509 | 9/1955 | Lundsted et al. | 260—33.2 |
| 2,858,291 | 10/1958 | McAdam | 260—837 |
| 2,868,761 | 1/1959 | Jolly | 260—837 |
| 2,885,380 | 5/1959 | Elarde | 260—837 |

FOREIGN PATENTS 736,457  9/1955  Great Britain.

GEORGE F. LESMES, *Primary Examiner.*